(12) United States Patent
Tagawa (10) Patent No.: US 6,688,710 B2
(45) Date of Patent: Feb. 10, 2004

(54) ELECTRONIC DEVICE CABINET AND ELECTRONIC DEVICE

(75) Inventor: Kazusato Tagawa, Sodegaura (JP)

(73) Assignee: Sony Computer Entertainment Inc., Tokyo (JP)

( * ) Notice: Subject to any disclaimer, the term of this patent is extended or adjusted under 35 U.S.C. 154(b) by 271 days.

(21) Appl. No.: 09/848,678

(22) Filed: May 3, 2001

(65) Prior Publication Data

US 2002/0044428 A1 Apr. 18, 2002

(30) Foreign Application Priority Data

May 9, 2000 (JP) ........................................ 2000-135784

(51) Int. Cl.$^7$ ................................................. H05K 7/18
(52) U.S. Cl. .................................... 312/223.2; 312/327
(58) Field of Search ........................... 312/223.1, 223.2, 312/327, 328, 319.2

(56) References Cited

U.S. PATENT DOCUMENTS

| | | | | |
|---|---|---|---|---|
| 3,930,594 A | * | 1/1976 | Jungmann | .................... 220/830 |
| 4,036,396 A | * | 7/1977 | Kennedy et al. | ............ 220/242 |
| 4,571,456 A | * | 2/1986 | Paulsen et al. | ............. 379/457 |
| 4,685,558 A | * | 8/1987 | Filiz et al. | .................... 206/1.5 |
| 4,961,126 A | * | 10/1990 | Suzuki | ....................... 361/680 |
| 4,967,924 A | | 11/1990 | Murofushi et al. | |
| 5,079,799 A | * | 1/1992 | Rude et al. | .................... 16/342 |
| 5,231,734 A | * | 8/1993 | Rude | ............................ 16/342 |
| 5,555,157 A | * | 9/1996 | Moller et al. | ............... 361/683 |
| 5,793,742 A | * | 8/1998 | Sandell et al. | .............. 369/291 |
| 5,992,681 A | | 11/1999 | Byrd et al. | |

FOREIGN PATENT DOCUMENTS

| | | |
|---|---|---|
| EP | 0 263 376 A1 | 4/1988 |
| EP | 0 635 649 A1 | 1/1995 |
| FR | 2820791 * | 8/2002 |
| JP | 07-14679 | 3/1995 |
| JP | 07-32982 | 6/1995 |
| TW | 388865 | 5/2000 |

\* cited by examiner

Primary Examiner—Janet M. Wilkens
(74) Attorney, Agent, or Firm—Katten Muchin Zavis Rosenman (57) ABSTRACT

An electronic device cabinet and an electronic device wherein the rotation of the cover upon opening can be slowed with a simple hinge mechanism. A rotating member provided with a protruding piece is provided on said cover. Said rotating member comes into sliding contact with contact parts provided on an upper case main body and slides together with the rotation of cover. The rotation of cover is slowed by having protruding piece come into contact with contact parts, and the rotation of cover is stopped by said protruding piece engaging a receiving member disposed between said contact parts.

12 Claims, 7 Drawing Sheets

ELECTRONIC DEVICE CABINET AND ELECTRONIC DEVICE

FIELD OF THE INVENTION

This invention concerns an electronic device cabinet, and an electronic device, that has a cover whose end is attached rotatably to the cabinet main body, and in particular this invention concerns a hinge mechanism for slowing the rotation of said cover during opening with respect to said cabinet main body.

BACKGROUND OF THE INVENTION

Heretofore known as cabinets for entertainment devices that employ a CD, DVD, CD-ROM, DVD-ROM, or other optical disk are ones that have a cover whose end is attached rotatably to the cabinet main body and in which this cover is opened and closed using elastic force. Such a cabinet is constituted in such a way that the cover, of circular shape to fit the shape of the optical disk, is attached rotatably to the inner side of the cabinet main body by a hinge or other mechanism, a spring or other impelling means is provided inside the cabinet main body, and releasing the elastic force of the spring opens the cover, and provided on the front of the cabinet main body is an engaging member that advances and retracts with respect to the cover, and the cover can be closed by engaging the end of the cover with this engaging member.

In such an entertainment device, when the engagement by the engaging member is released, the cover opens by the elastic force of the spring, and the catching member inside it is exposed, thus allowing an optical disk to be mounted on this catching member. After mounting, by closing the cover, once again engaging the end of the cover with the engaging member, accommodating the optical disk, and turning on the power, etc., one can play back the content recorded on the optical disk and enjoy a game or music, etc. And since it suffices to be able to mount an optical disk, it is sufficient that the cover be able to rotate in a range so that the cover will be roughly perpendicular to the cabinet main body, and for this purpose a stopper to keep the rotation of the cover to within the prescribed angle is provided on the hinge mechanism part.

However, in an electronic device cabinet in which the cover is opened and closed using such elastic force, if the elastic force of the spring is too strong, the cover will forcefully strike the stopper, and the reaction will cause the cover to spring back, making it difficult to use. And if the elastic force of the spring is too small, the cover will rotate slowly, likewise making it difficult to use.

Methods are conceivable in which a link mechanism, etc. is used to slow down the rotation of the lid near the rotation stopping position, but the internal structure will be more complicated, making this undesirable as the structure of an electronic device that requires light weight and small size.

OBJECTS OF THE INVENTION

It is an object of the present invention, therefore, to provide an electronic device cabinet and an electronic device that can appropriately slow down the rotation of the cover with a simple mechanism and are easy to use.

Other objects and advantages of the invention will become clear upon review of the following detailed description in conjunction with the appended drawings.

SUMMARY OF THE INVENTION

An electronic device cabinet has a cover whose end is attached rotatably to a cabinet main body and is opened and closed using elastic force. Provided on said cover is a sliding part that comes into contact with said cabinet main body on at least part of the rotation range of said cover and slides together with the rotation of the cover. The rotation of the cover due to the elastic force of the spring is appropriately slowed down by having the sliding part come into contact with the cabinet main body, preventing it from forcefully striking a stopper or other rotation stopping member, and preventing the cover from springing back.

Conceivable as an electronic device for which the electronic device cabinet of this invention can be used is an entertainment device such as a CD or DVD player or a game device, and using this invention on these electronic devices can simplify the structure of the cabinet, which is desirable in making electronic devices smaller and lighter, and in reducing their cost.

It is preferable that said sliding part be constituted as a protruding piece that is formed on the inner side of the cover, and that said contact parts are constituted in a groove shape that clasps this protruding piece and comes into contact with both sides of said protruding piece. By constituting the sliding part and contact parts in this way, a large contact area of the sliding part and contact parts can be ensured, thereby greatly reducing the rotation operation of the cover in a small rotation range. It is also preferably that the contact parts are provided with sloping surfaces for guiding the protruding piece into contact with the contact parts.

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

In the following we describe, with reference to the drawings, an embodiment of this invention.

Figure 1:
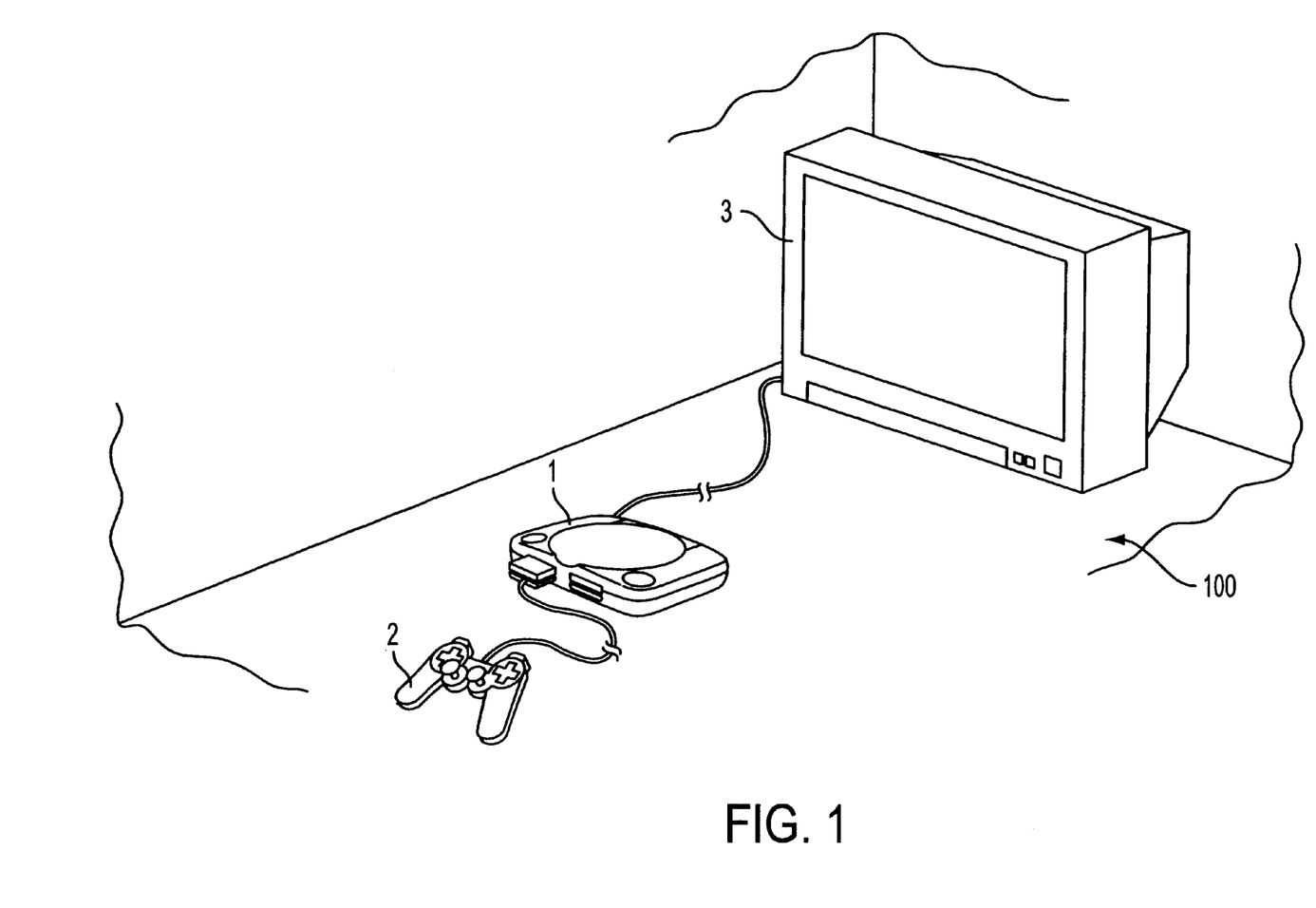
FIG. 1 is a perspective view of a living room showing an electronic device of the present invention.

FIG. 1 shows part of a living room 100 in which is set up a television receiver 3, which outputs images and sound, etc., an entertainment device 1, which is an electronic device that is connected to this television receiver 3, and a controller 2, which is an operation device that sends instructions to entertainment device 1. Entertainment device 1 for example reads a game program, etc. recorded on an optical disk, etc. and executes it according to instructions from controller 2 operated by the user (game player).

Figure 2:
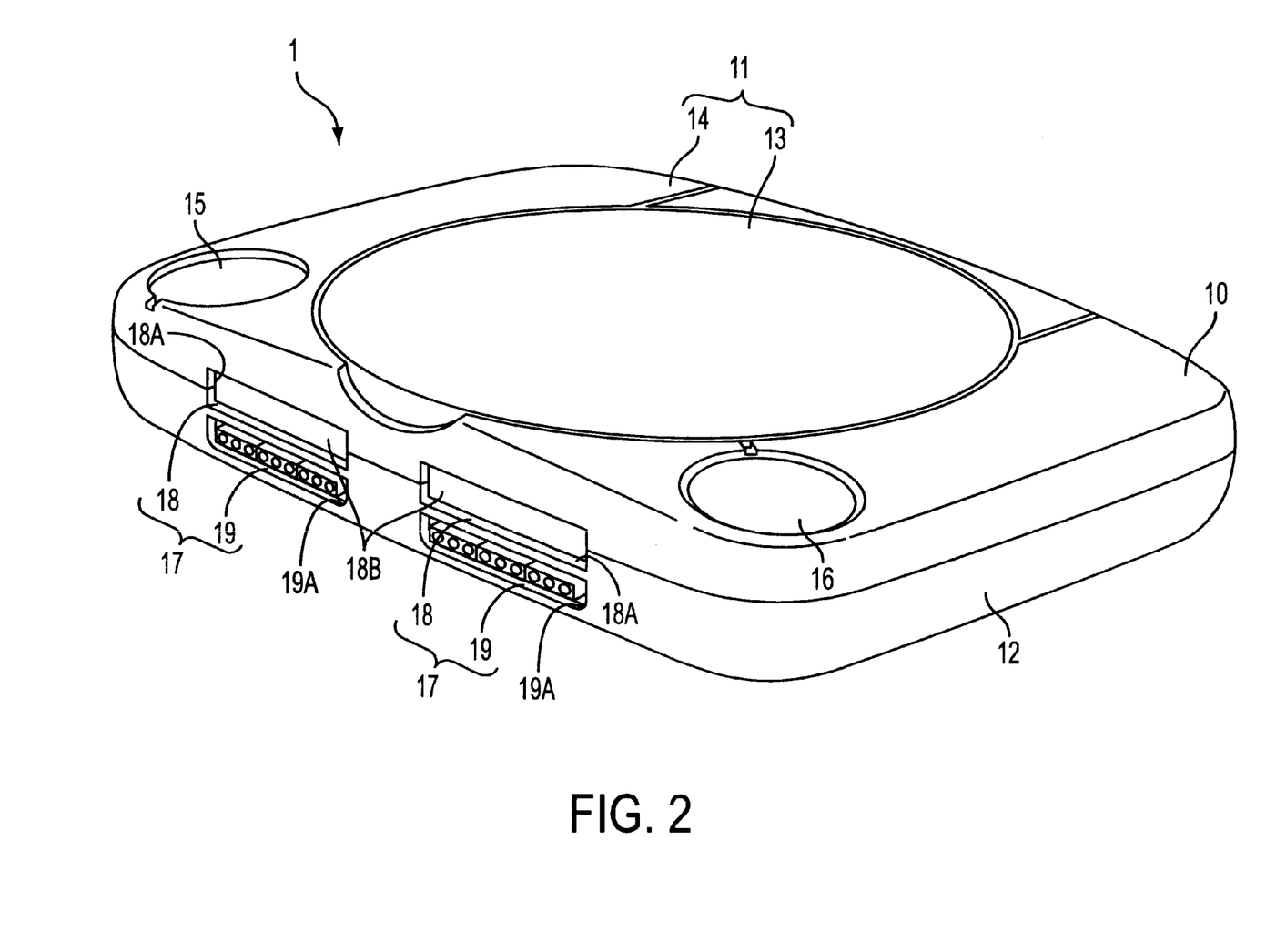
FIG. 2 is a perspective view of an entertainment device of the invention.

As shown in FIG. 2, entertainment device 1 comprises a device main body (not pictured), which has electronic parts, etc., and entertainment device cabinet (hereafter called "cabinet") 10, which has an upper case 11 and a lower case 12 and is preferably formed in a flat square shape. Upper case 11, which covers the device main body from above, has a flat roughly circular cover 13 provided in the middle and an upper case main body 14 provided around this cover 13.

On the left side of cover 13 is power button 15, which is operated when turning the power to the device on or off, and on the right side of cover 13 is open-close button 16, into which is built an engaging member, not pictured, that advances and retracts with respect to cover 13 for opening and closing said cover 13. Two slots 17 are exposed on the side of cabinet 10, each having a memory card insertion part 18, which is positioned toward the top of the slots 17, and a controller connection part 19, which is positioned toward the bottom of the slots 17. Memory card insertion part 18 is for inserting a memory card or other external auxiliary memory device, and its insertion hole 18A is preferably formed in rectangular shape, with its longer direction being horizontal. Provided on this memory card insertion part 18 is jack or cover 18B for protecting the connection terminals provided inside it. Controller connection part 19 is an input-output terminal for the input and output of signals; to which is connected the connection terminal (not shown) formed on the end of a controller cable that extends from controller 2 (FIG. 1). Insertion hole 19A is preferably formed in rectangular shape, with its longer direction being horizontal, and it is shaped so that its corners at the bottom are rounder than its corners at the top. Shaping insertion hole 19A in this way prevents the connection terminal of controller 2 from being connected in the wrong orientation. Also, because the shape of insertion hole 19A is made with a structure that is different from the shape of insertion hole 18A of memory card insertion part 18, there is no danger of mistakenly inserting an external auxiliary memory device into insertion hole 19A of controller connection part 19, and vice versa. Having two of these controller connection parts 19 allows two controllers 2 to be connected, allowing two users to play competitive games, etc. The results of operating with controllers 2 connected to controller connection parts 19 are recorded on a memory card as an external auxiliary memory device inserted into memory card insertion part 18 positioned above each.

Positioned on the side opposite the side on which these slots 17 are positioned as shown in FIG. 2, are a power connector (not shown), to which an AC adapter is connected and which is a power supply terminal supplying electric power from an external power source (not shown) to the device main body, and video and audio output terminals (not shown) for outputting to television receiver 3 video signals, audio signals, and various other signals recorded on an optical disk (not shown).

Figure 3:
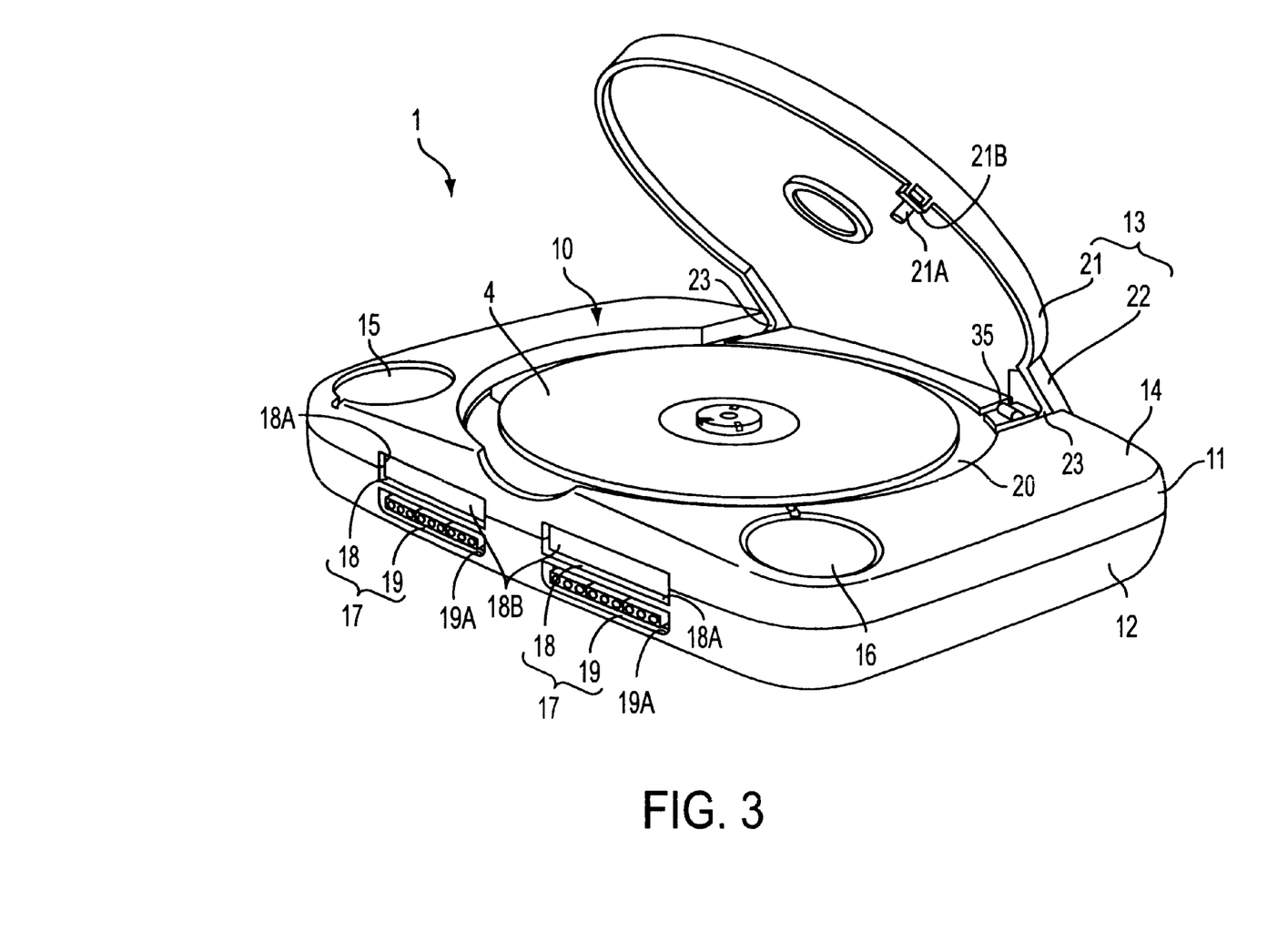
FIG. 3 is a perspective view of the entertainment device of FIG. 2 with its cover open.

As shown in FIG. 3, cover 13 comprises a roughly flat round disk covering part 21, which covers disk mounting part 20 onto which optical disk 4 is mounted, and attachment part 22, which extends from part of the circumferential edge of this disk covering part 21 and whose end is rotatably attached to upper case main body 14. Rod shaped members 21A are provided on the circumferential edge of disk covering part 21, and engage an open-closed detection switch (not shown) that detects whether cover 13 is open or closed. Engagement piece 21B, also provided on the circumferential edge of disk covering part 21 engages and engaging member (not shown) for maintaining the cover 13 in a closed position.

Figure 4:
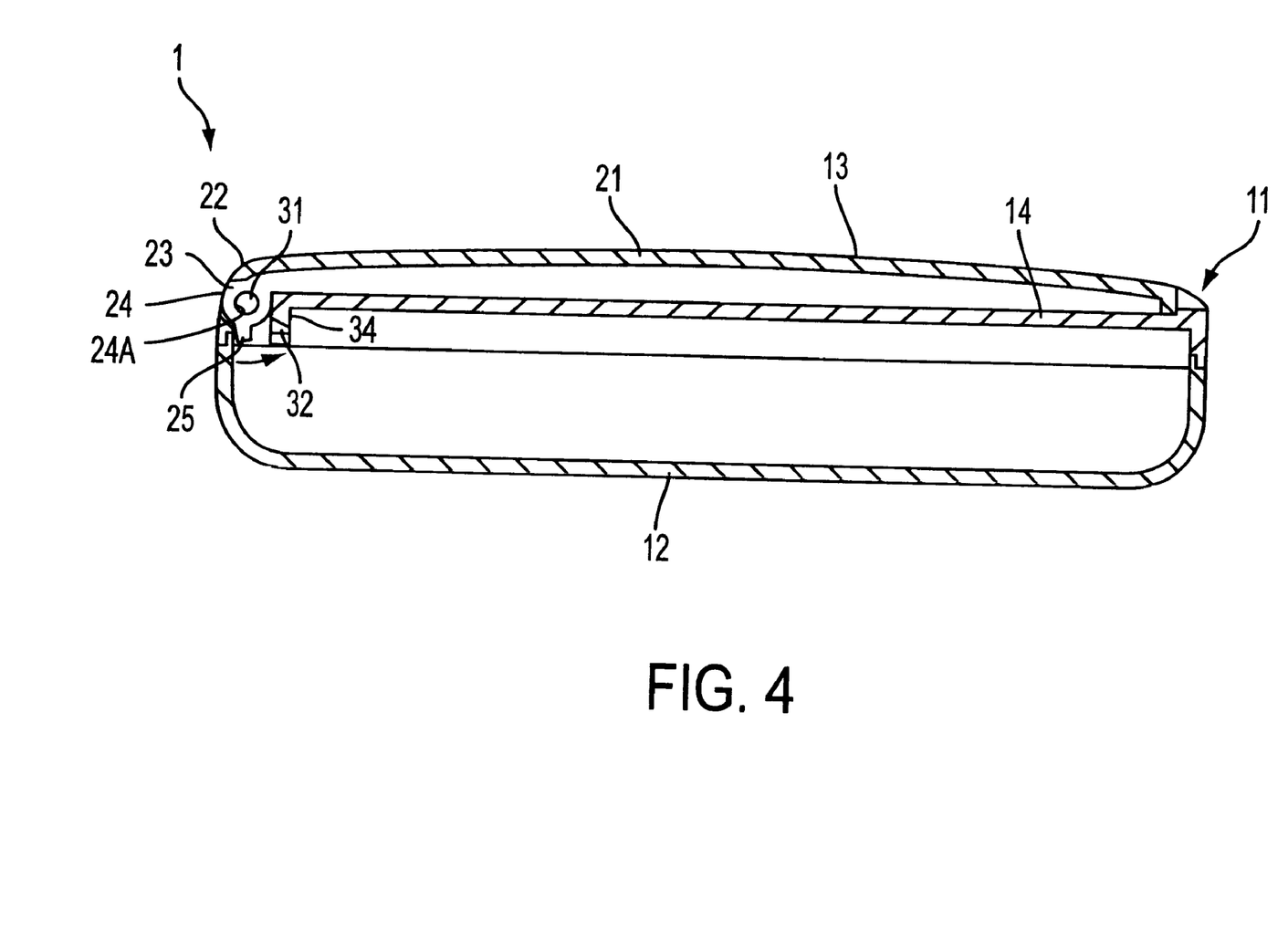
FIG. 4 is a cross-sectional view of the entertainment device with its cover closed.
Figure 5:
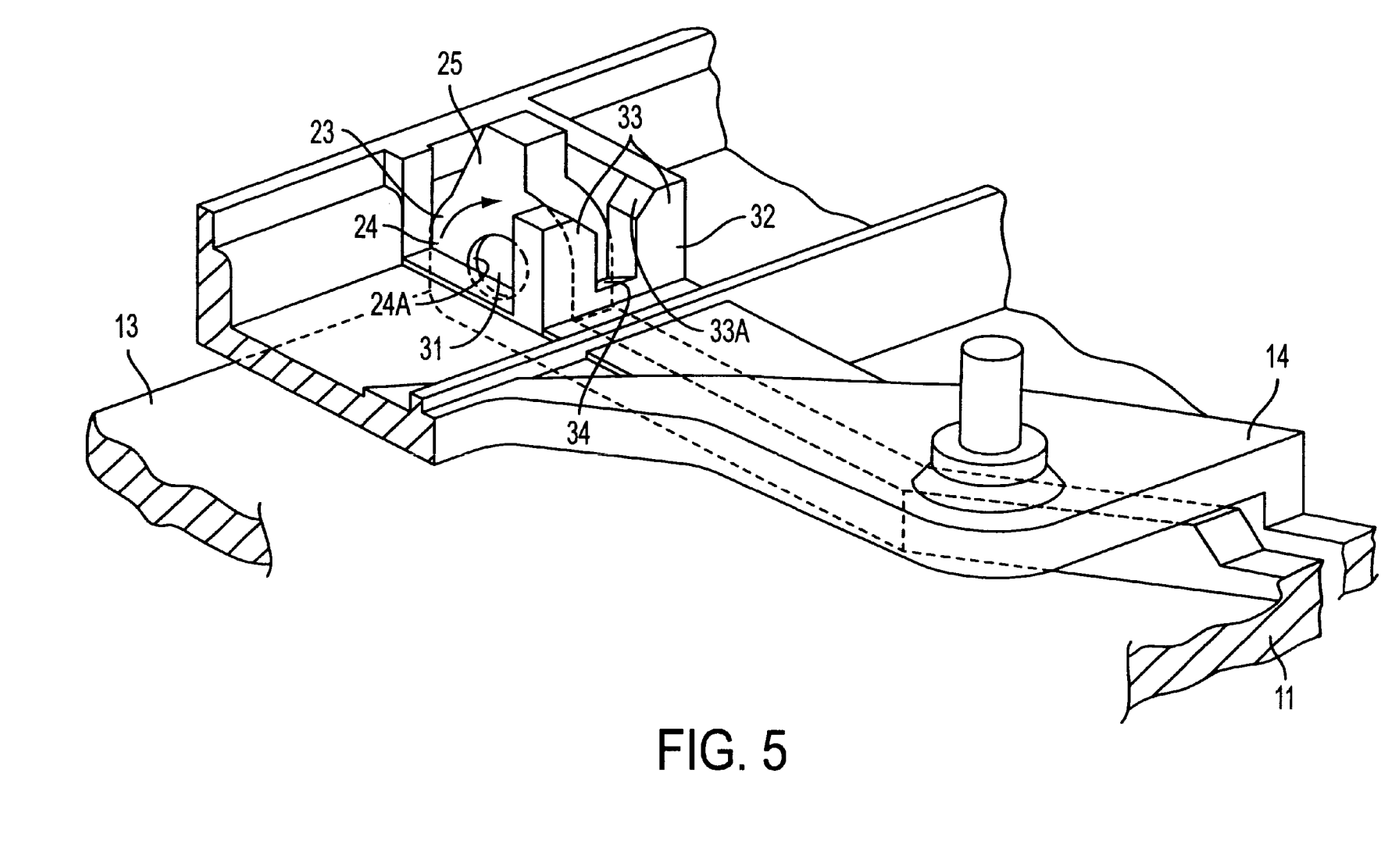
FIG. 5 is an enlarged perspective view showing the hinge mechanism of the present invention.

As shown in FIGS. 4 and 5, on both ends along the longitudinal direction of the end of attachment part 22 is a rotation part 23 that has insertion hole 24A pierced by pin 31 formed on upper case main body 14 and can rotate about this pin 31 as its central axis. That is, attachment part 22 and upper case main body 14 are connected by a hinge mechanism consisting of pin 31 and rotation part 23, by which cover 13 is free to rotate with respect to upper case main body 14. Rotation part 23 comprises a cylinder-shaped rotation main body 24, in which insertion hole 24A is formed, and a square-shaped protruding piece 25, which protrudes from part of the side of this rotation main body 24 toward lower case 12. As indicated by arrows in FIGS. 4 and 5, when cover 13 is opened, rotation part 23 rotates about pin 31.

Provided on the rotation direction side of rotation part 23 of upper case main body 14 is a square-"C"-shaped member 32, which in the front has the shape of a "C" having right-angle corners and lying with its two ends upward. More precisely, square-"C"-shaped member 32 causes the protruding piece 25 that rotates as the cover 13 rotates to slide, and stops the rotation of the protruding piece 25 in the rotation stopping position of said cover 13; and has integrally formed therewith a pair of contact parts 33 and a receiving part 34 disposed between said contact parts 33; and is provided near the rotation stopping position where the rotation of rotation part 23 is stopped when cover 13 is opened.

Figure 6:
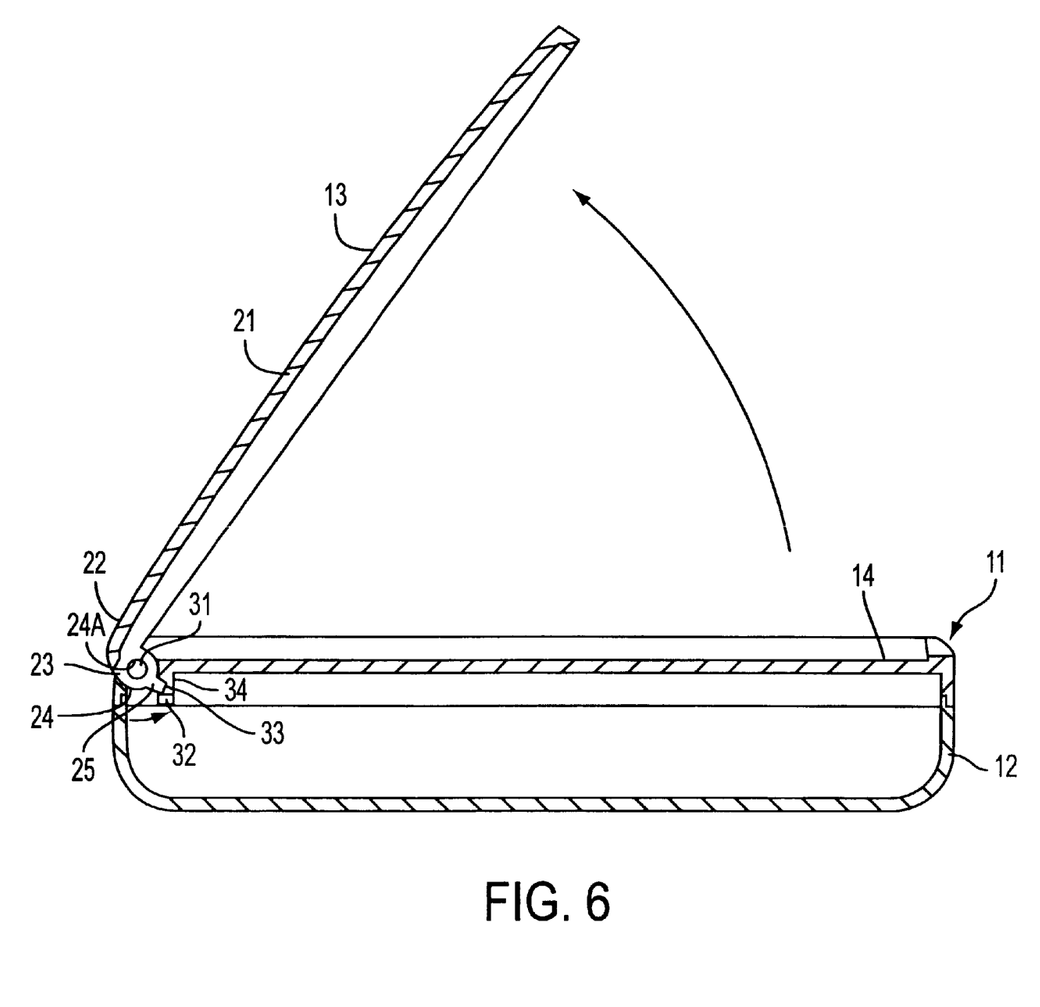
FIG. 6 is a rough cross-sectional view showing an entertainment device with its cover open in said embodiment.
Figure 7:
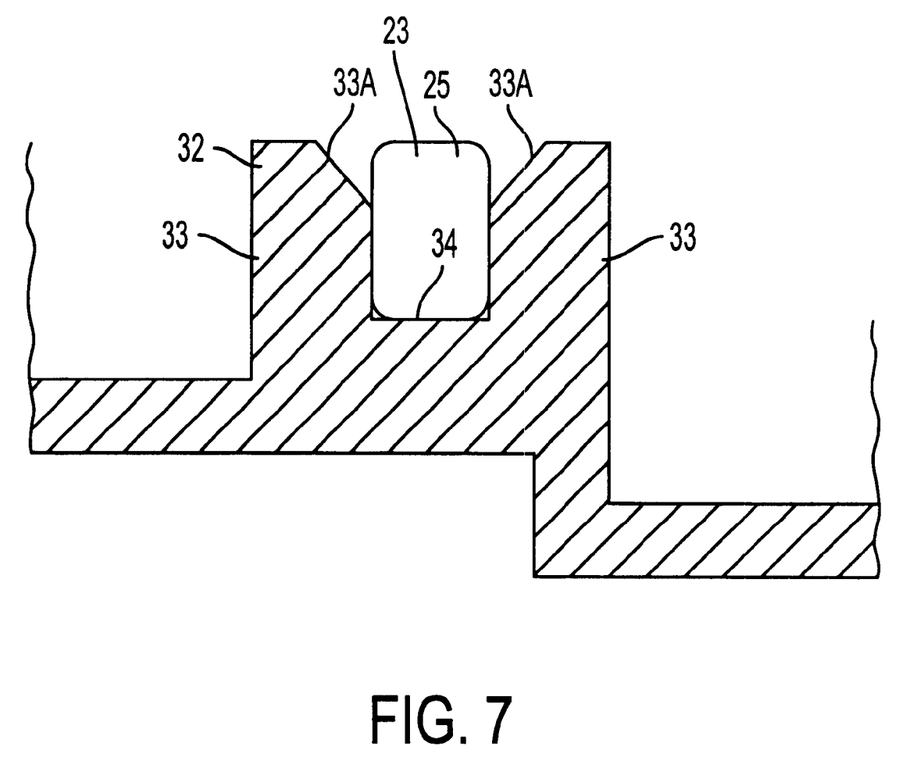
FIG. 7 is a cross-sectional view showing the relationship between the square-C-shaped member and the protruding piece of the invention with the cover open.

As shown in FIGS. 6 and 7, contact parts 33 are formed in a groove shape so as to clamp between them protruding piece 25, which rotates together with the rotation of the cover 13. Protruding piece contacts receiving part 34 in between contact parts 33 in order to stop the rotation of cover 13 at the prescribed angle. That is, the angle and position of receiving part 34 where protruding piece 25 comes into contact with it is determined according to the rotation stopping position of the cover. Also, sloping surfaces 33A that guide protruding piece 25 are formed at the top of the facing sides of contact parts 33 so as to make it easier for protruding piece 25 of rotation piece 23 to enter between contact parts 33 when cover 13 is opened. Therefore protruding piece 25 of rotation part 23 is a sliding part that comes into contact with contact parts 33 near the rotation stopping position of cover 13 and slides as said cover 13 rotates, and receiving part 34 is a rotation stopping part that stops the rotation of cover 13 at a prescribed angle. Here, provided inside upper case main body 14 is spring 35 (see FIG. 3), which is an impelling means, one end of which comes into contact with cover 13. Also, in this embodiment we have described the hinge mechanism of one end of attachment part 22, but the hinge mechanism on its other end has the same composition, so its description has been omitted here.

The description of the operation of cover 13 of such an entertainment device 1 is as follows.

First, if cover 13 (FIG. 6) is to be opened, when open/close button 16 is pressed, then as shown in FIGS. 3 and 7, the engagement by the engaging member (not shown) is released, and cover 13 rotates open by the elastic force of spring 35 and the rotation of rotation part 23 until protruding piece 25 is sandwiched between contact parts 33. When protruding piece 25 comes into contact with contact parts 33 near the rotation stopping position, i.e. prior to contact with receiving part 34, it is slowed down by the sliding of protruding piece 25 between contact parts 33. Then, while slowing down, it stops when it comes to the rotation stopping position, that is, when protruding piece 25 comes into contact with receiving part 34. On the other hand, cover 13 can be closed, by pressing the upper surface of said cover 13 and engaging engagement piece 21B with the engaging member (not shown).

Thus, because protruding piece 25, which comes into contact with contact parts 33 of upper case main body 14, is provided on cover 13, the rotation of cover 13 due to the elastic force of spring 35 can be appropriately slowed down by protruding piece 25 coming into contact with contact parts 33. This prevents cover 13 from forcefully striking a stopper or other rotation stopping member, thereby preventing the spring-back of cover 13 due to reaction and allowing one to make an easy-to-use entertainment device 1.

In addition, because protruding piece 25 comes into contact with contact parts 33 near the rotation stopping position when cover 13 opens, the rotation of cover 13 is slowed down near the rotation stopping position, which makes it possible to prevent the spring-back of cover 13 while maintaining a fast rotation operation, further improving the ease of use.

In addition, because contact parts 33, which come into contact with protruding piece 25, and receiving part 34, which stops the rotation of cover 13, are integrally constructed, the number of parts that protrude on the inside surface of upper case main body 14 can be minimized, and entertainment device 1 can be made lighter.

In addition, a large contact surface is formed between protruding piece 25 and contact parts 33, and the rotation operation of cover 13 can be greatly slowed down in a small rotation range.

In addition, because sloping surfaces 33A, which guide protruding piece 25, are formed at the top of the facing sides of contact parts 33 that make up the top part of the groove, protruding piece 25 can be appropriately guided into the groove between contact parts 33 and a slowdown due to sliding can be assured.

This invention is not limited to the aforesaid embodiment but can include alternatives and modifications including, but not limited to, the following.

For example, while in the above embodiment sloping surfaces are formed on the contact parts, such sloping surfaces may be eliminated if, for example, the shape is such that the protruding piece securely enters the groove between the contact parts. In addition, while in the above described embodiment both sides of the protruding piece are made to come into contact with the contact parts, it may be sufficient if only one side of the protruding piece comes into contact with a contact part, in which case a single contact part might suffice. With such an embodiment, and to ensure left-right sliding balance, it is desirable to provide two protruding pieces on the cover, constituted so that they slide along the inner surface in two respective locations.

In addition, while the square-"C"-shaped member is described as being formed integrally, the contact parts and receiving part may be formed separately and assembled together when the entertainment device is manufactured.

Also, in the above embodiment, the contact parts are provided near the rotation stopping position, but it is not limited to this. For example, the rotation starting position and rotation stopping position of the protruding piece may be provided in an approximately intermediate part. In addition, the rotation stopping part of this invention is not limited to a receiving part; as long as it stops the rotation of the cover, its shape and composition may be determined to suit the implementation. Also, the sliding part of this invention is not limited to a protruding piece; in short, as long as it comes into contact with the upper case main body in at least part of the rotation range of the cover and slides together with the rotation of the cover, its shape and composition may be determined to suit the implementation. In addition, in the above embodiment, a hinge mechanism is provided on both ends of the attachment part, but it is not limited to this; it may be provided on one end only.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An electronic device comprising:
   a) a cabinet having a cabinet main body and a cover,
   b) said cover being rotatably attached to said cabinet main body and positionable between an open position and a closed position and being biased toward the open position, and
   c) a sliding part provided on said cover that is movable with said cover,
   d) wherein said sliding part comes into contact with said cabinet main body on at least part of the rotatable position of said cover, and
   e) wherein said cabinet main body further comprises contact parts integrally formed with said cabinet main body, said contact parts being adapted for contact with said sliding part, and wherein said cabinet main body further comprises a rotation stopping part that stops the rotation of said cover about said cabinet main body.

2. An electronic device in accordance with claim 1, wherein said sliding part further comprises a protruding piece formed on the inner side of the cover, and said contact parts are constructed in a groove shape to clasp said protruding piece therebetween.

3. An electronic device in accordance with claim 2, further comprising sloping surfaces formed on the upper part of said contact parts that guide said protruding piece into engagement with said contact parts.

4. An electronic device comprising:
   a) a cabinet having a cabinet main body and a cover,
   b) said cover being rotatably attached to said cabinet main body and positionable between an open position and a closed position and being biased toward the open position, and
   c) a sliding part provided on said cover that is movable with said cover,
   d) wherein said sliding part comes into contact with said cabinet main body on at least part of the rotatable position of said cover,
   e) wherein a portion of said sliding part comes into contact with said cabinet main body only when said cover nears the open position, and
   f) wherein said cabinet main body further comprises contact parts integrally formed with said cabinet main body, said contact parts being adapted for contact with said sliding part, and wherein said cabinet main body further comprises a rotation stopping part that stops the rotation of said cover about said cabinet main body.

5. An electronic device in accordance with claim 4, wherein said portion of said sliding part further comprises a protruding piece, and said contact parts are constructed in a groove shape to clasp said protruding piece therebetween.

6. An electronic device in accordance with claim 5, further comprising sloping surfaces formed on the upper part of said contact parts that guide said protruding piece into engagement with said contact parts.

7. An electronic device cabinet comprising:

a) a cabinet main body and a cover, b) said cover being rotatably attached to said cabinet main body and positionable between an open position and a closed position and being biased toward the open position, and c) a sliding part provided on said cover that is movable with said cover, said sliding part further comprising a pair of side surfaces and a bottom surface, d) wherein said sliding part comes into contact with said cabinet main body on at least part of the rotatable position or range of said cover, and e) wherein said cabinet main body further comprises contact parts integrally formed with said cabinet main body, said contact parts being adapted for contact with said sliding part, and wherein said cabinet main body further comprises a rotation stopping part that stops the rotation of said cover about said cabinet main body.

8. An electronic device cabinet in accordance with claim 7, wherein said sliding part further comprises a protruding piece extending outwardly therefrom, and said contact parts are constructed in a groove shape to clasp said protruding piece therebetween.

9. An electronic device cabinet in accordance with claim 8, further comprising sloping surfaces formed on the upper part of said contact parts that guide said protruding piece into engagement with said contact parts.

10. An electronic device cabinet in accordance with claim 7, said contact parts being adapted for continuous contact with said side surfaces of said sliding part.

11. An electronic device in accordance with claim 10, wherein said bottom surface of said sliding part further comprises a protruding piece, and said contact parts are constructed in a groove shape to clasp said protruding piece therebetween.

12. An electronic device in accordance with claim 11, further comprising sloping surfaces formed on the upper part of said contact parts that guide said protruding piece into engagement with said contact parts.

* * * * *